United States Patent [19]

Bellafiore

[11] Patent Number: 5,537,465
[45] Date of Patent: Jul. 16, 1996

[54] INTEGRATED TELEPHONE AND INTERCOM SYSTEM

[76] Inventor: Vincent M. Bellafiore, 3801 Plainedge Ct., Levittown, N.Y. 11756

[21] Appl. No.: 146,808

[22] Filed: Nov. 2, 1993

Related U.S. Application Data

[63] Continuation of Ser. No. 677,158, Mar. 29, 1991, abandoned.

[51] Int. Cl.⁶ .............................. H04M 1/72; H04M 9/02
[52] U.S. Cl. ........................ 379/157; 379/159; 379/165; 379/215; 379/373; 379/393
[58] Field of Search ................................... 379/201, 210, 379/215, 157, 156, 165, 163, 162, 393, 373, 418, 159, 160

[56] References Cited

U.S. PATENT DOCUMENTS 4,588,864  5/1986  Carter et al. ........................... 379/157
4,631,367  12/1986  Coviello et al. ......................... 379/157
4,759,055  7/1988  Okumura et al. ........................ 379/157
5,027,391  6/1991  O'Neill et al. .......................... 379/157

*Primary Examiner*—Jeffery Hofsass
*Assistant Examiner*—Fan Tsang
*Attorney, Agent, or Firm*—Bauer & Schaffer

[57] ABSTRACT

An integrated telephone system is provided, having a connection to a Central Office (CO) line and a connection to at least one secondary line. The CO line and/or the secondary line may be selectively accessed for two-way communication independently of each other and may be signalled for call waiting, call holding, and busy fuction. The accessing and selection are operative through a single subscriber telephone instrument. The entire system circuits are mounted on a single circuit board having pins for connection to common bus for combined use with a plurality of similarly constructed systems assigned to individual subscribers.

5 Claims, 4 Drawing Sheets

INTEGRATED TELEPHONE AND INTERCOM SYSTEM

This is a continuation of Ser. No. 07/677,158, filed Mar. 29, 1991, now abandoned.

BACKGROUND OF THE INVENTION

The present invention relates to a telephone system and in particular to a versatile universal single phone system integrating the attributes of an external Central Office line system and of an interior secondary phone system.

As those who have lived in a tenement or an apartment house are fully aware, two phone systems are generally provided. The first is the ordinary and conventional telephone system tied to the telephone company Central Office by which the subscriber can obtain a line connected to anyone in any location in the world who has a similar line. The second system provides the subscriber with the ability to communicate, with the some difficulty, with certain of his or her neighbors within the local complex, the building guard, the doorman, or the building manager.

It is both an inconvenience and an annoyance to have two phones in one's apartment, each serving a different need. It is also expensive, as one must subscribe to the commercial phone system, and also pay for the separate intercom system.

Attempts have been made to overcome these disadvantages by providing highly complex systems through the dialing of various codes in order to provide communication within a building or apartment complex. Such systems are commonly found in large hotels, offices, or complexes, where the cost of the phone system is only a relatively minor factor. In addition to the added costs, such systems are not truly versatile as intercom calls are possible only through the use of increasingly complex dialing codes and excessive tolls. In these systems separate phone numbers are required. More importantly, these systems sacrifice such functions as call waiting, hold, redialing, and the like now common in commercial phone systems, in order to make room for the intercom functions.

It is an object of the present invention to provide an integrated system by which both outside commercial phoning via a Central Office (CO) and interior intercom calls can be readily made.

It is a further object of the present invention to provide a "one phone" system in which PBX intercom, or auxilliary CO calls can be superimposed without interference with the Central Office functions and without extra fee.

It is a further object of the present invention to provide a "one phone" combined CO and intercom system having none of the disadvantages of the conventional two phone systems.

More importantly, however, it is an object of the present invention to provide a system which in no way effects the commercial or CO system and may be installed via any registered and permissible jack or connection to a Central Office terminal without additional interface or modification of any Central Office system.

The foregoing objects together with numerous other objects and advantages will be apparent from the following disclosure of the present invention.

SUMMARY OF THE INVENTION

An integrated telephone system is provided having means for connection to a Central Office (CO) line and means for connection to at least one secondary line. The system includes means for selectively accessing the CO line and/or the secondary line for two-way communication on each of the lines as well as selection means for providing call waiting, call holding, and busy function for each of said lines, said accessing means. All of the selection means are operative through a single subscriber telephone instrument. The entire system is found in circuits mounted on a single circuit board having pin means connected to common bus means for combined use with a plurality of similarly constructed systems assigned to individual subscribers.

Full details of the present invention are set forth in the following description and illustrated in the accompanying drawings.

DESCRIPTION OF THE INVENTION

The details of the present invention are clearly detailed in the accompanying drawing, wherein conventional telephone components are represented by conventional symbols. However, before turning to the circuit diagram, it will be helpful to have an overview thereof.

I. Overview

Figure 1:
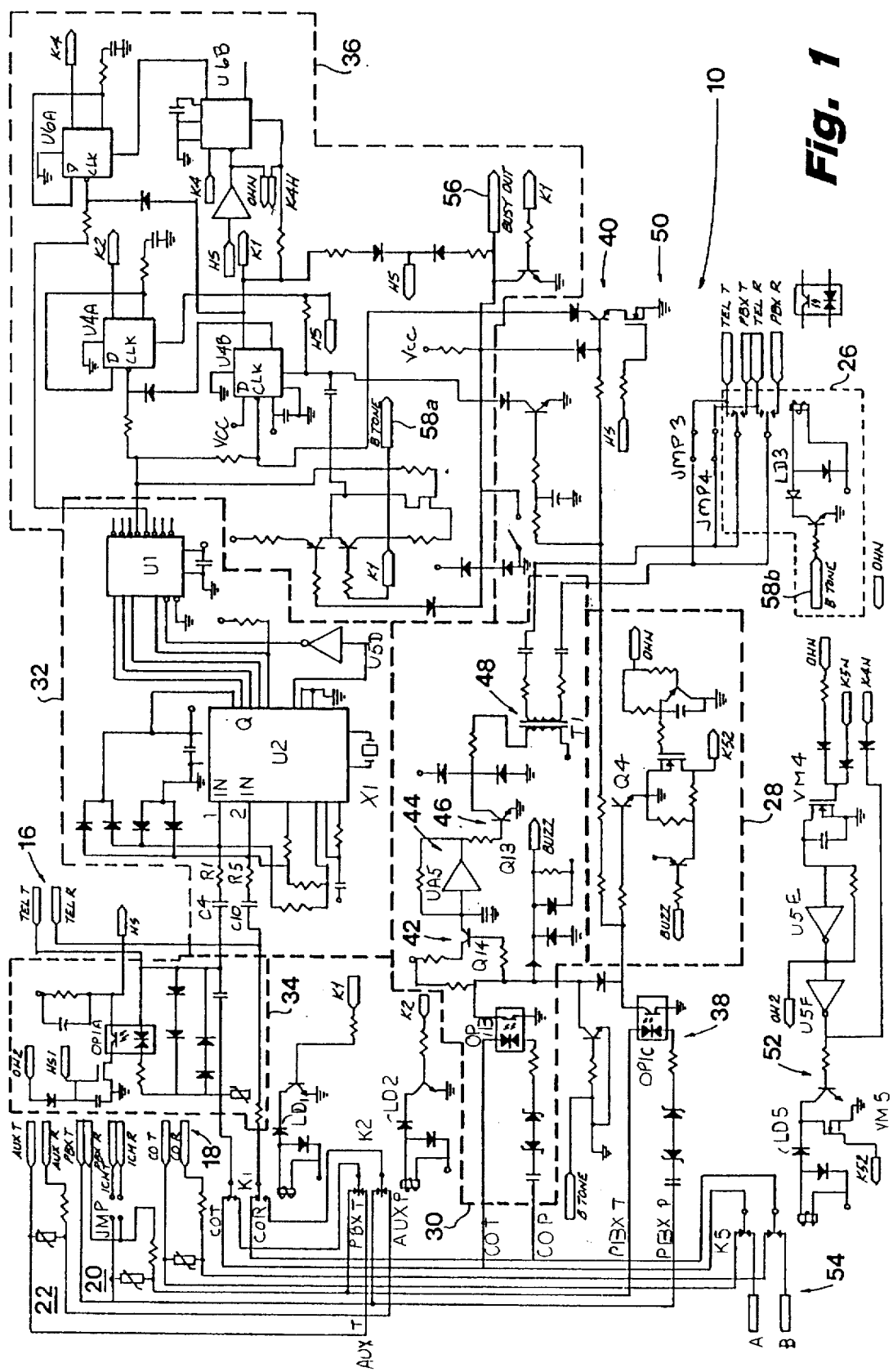
FIG. 1 is a circuit diagram of a phone system embodying the present invention.
Figure 2:
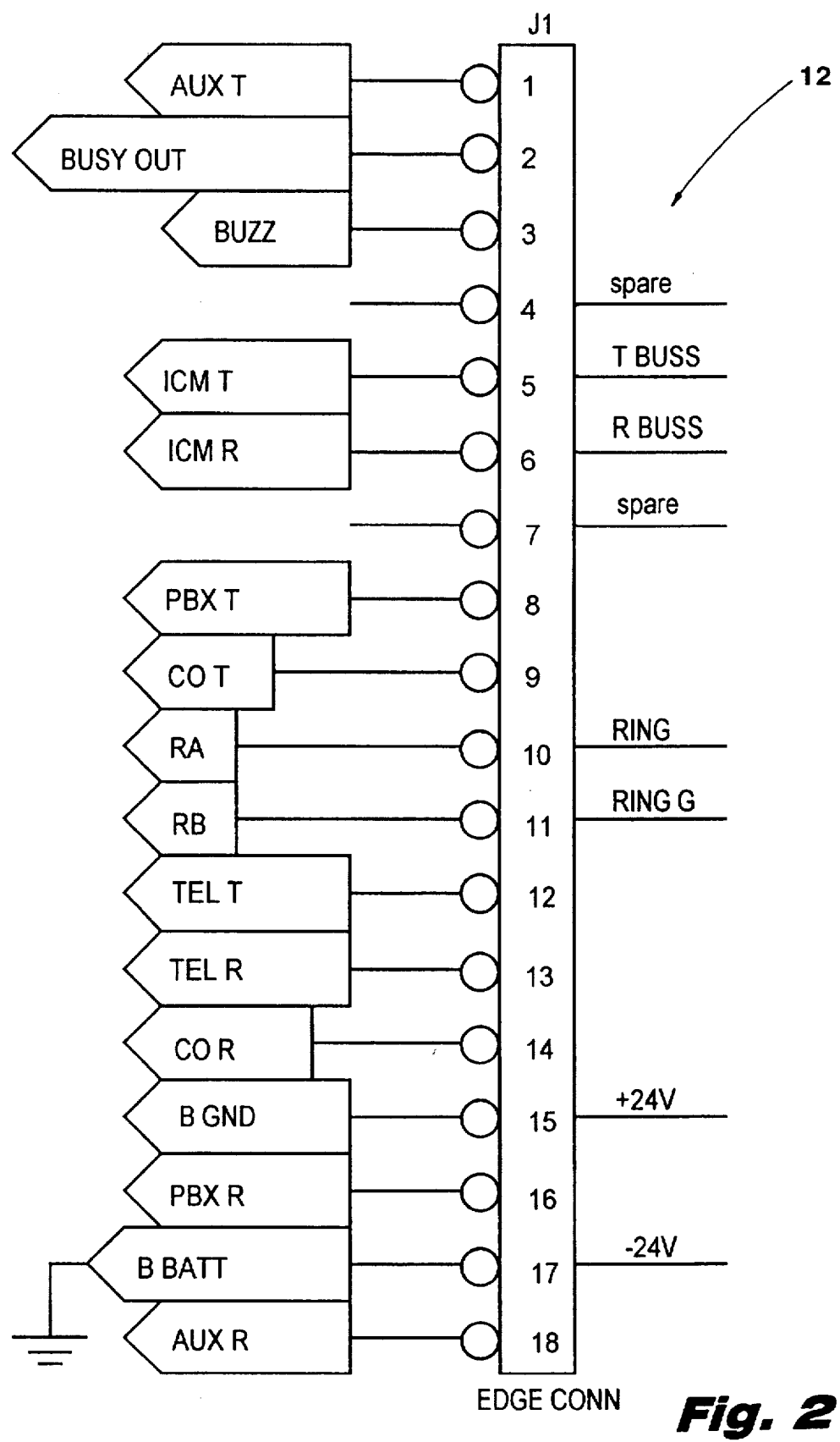
FIG. 2 shows the wiring connections to an 18 pin connector used to couple the present invention to the existing telephone network.
Figure 3:
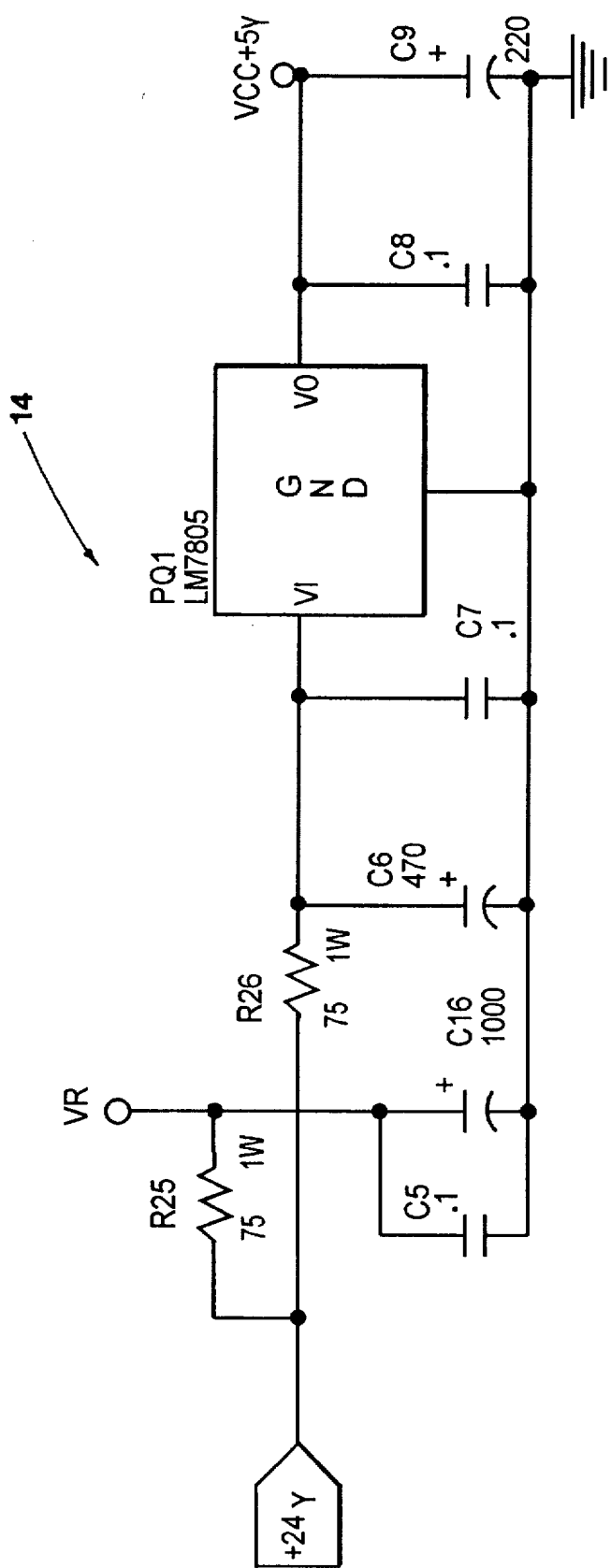
FIG. 3 shows an electrical schematic of a power supply for developing $V_r$ and 5 volt $V_{cc}$ voltages.

The circuit embodying the present invention is conveniently contained on a circuit board 10 such as a flat pack configured for slot insertion or stand-alone applications. As seen in FIG. 2, the circuit 10 has a standard eighteen-pin connector 12. Each subscriber is provided with a single circuit board 10 installed, for example, telephone IA2 (FIG. 1), which is similar to the way standard 400 type line cards are installed. Power is supplied externally and includes voltage regulator 14 shown in FIG. 3 to provide 24 V DC for relay functions as well as 5 V DC for control functions. The terminals of the power source 14 are labelled VR and Vcc, respectively. Normal power for the CO line functions is obtained from the Central Office directly.

The subscribers' phone instrument 16 is preferably a conventional DTMF instrument with an appropriate key pad. Connection to the Central Office (CO) line is made via any registered telephone jack terminal 18 (i.e. RJ21, 71C, etc.) as can the connection to an alternative PBX/ICM line 20 and an auxiliary line 22. Switching between the CO line and the alternative lines is effected by a series of relays K1 through K5, responsive to specific tone dialing by the user through the telephone set in accordance with the present invention. For example, by dialing the asterisk (*), which would connect the telephone 16 to either a PBX circuit (individual talkpath) or an Intercom circuit (common talkpath). The type of circuit selected is made via Berg jump connectors and is an installer option. The precise circuit operation for switching between the CO line and the secondary lines will be described below. The secondary line circuits allows two-way calling and incorporate call waiting to the primary or CO-line telephone circuit when necessary. The second alternate line, selected by dialing the asterisk twice (**), connects the telephone set 16 to an auxiliary two-wire circuit 22 for outgoing use such as modem, telefax, or the like.

Figure 4:
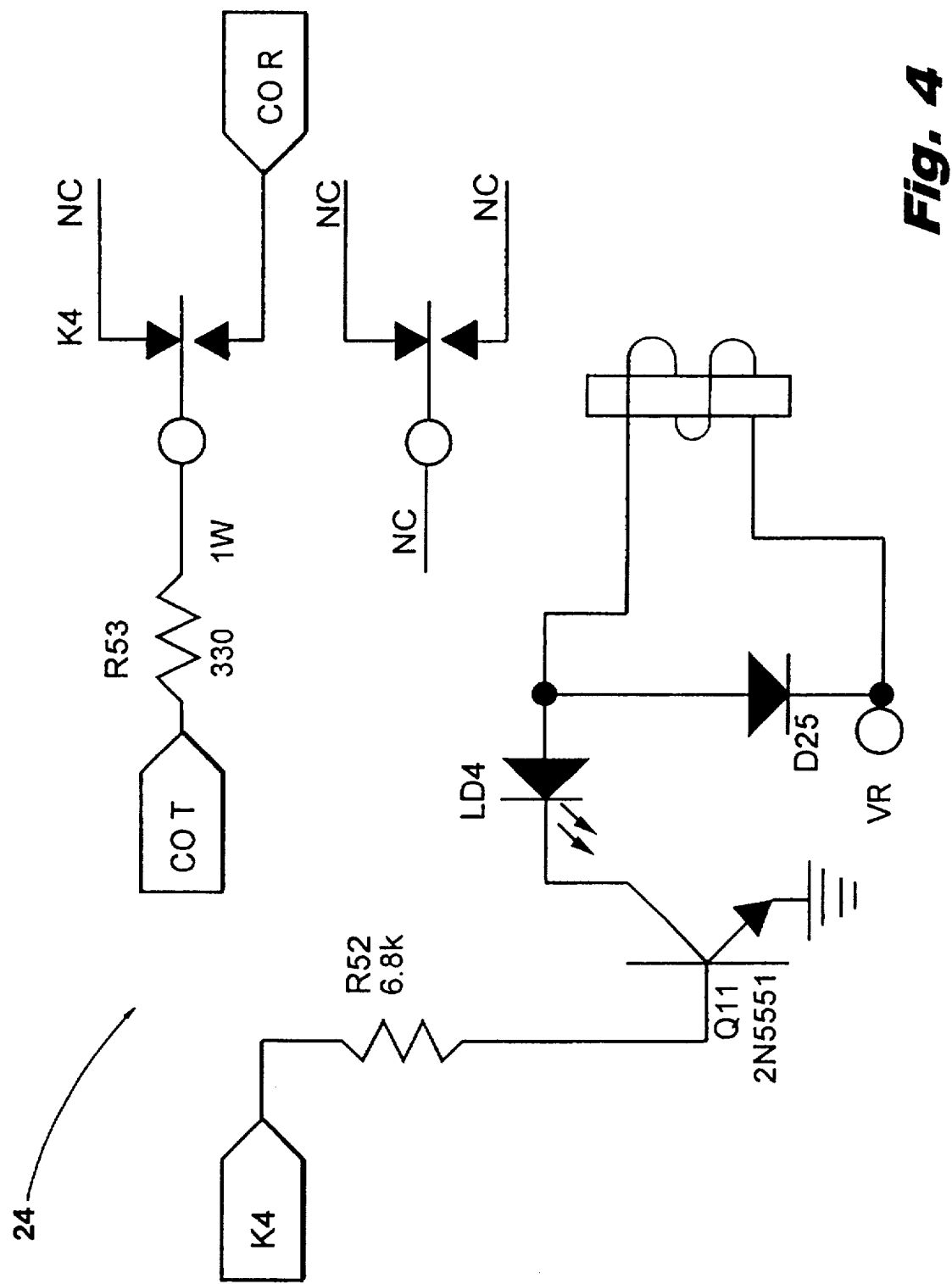
FIG. 4 is an electrical schematic for implementing a hold function according to the present invention.

As will be seen, the switching system provides a hold circuit 24 (FIG. 4) which places the CO line on hold by dialing the pound (#) key, allowing the user to communicate over any one of the two alternate lines (PBX/ICM or AUX CO) while remaining connected to an incoming or outgoing CO call. The present invention also incorporates a busy circuit 26 (FIG. 1) that would generate a busy tone on the first auxiliary line when it is in use in a shared tenant single talkpath status. A buzz circuit 28 is provided to ring or buzz the telephone set 16 via a standard single-pole, single throw, normally open momentary button or switch and a call waiting circuit 30 alerting the user of an incoming call. A local ring generator 32 (105 V AC, 20 cps) is supplied externally and connects to the connection RA and RB terminals of the board pin connector 12.

The circuit board 10 may also be installed on the CO side of the line. When this is done, two incoming lines may be connected to one telephone line and selection may be made by the user via the asterisk (*) button to an additional outgoing circuit from the CO. This would alleviate the need to install additional telephone lines from the CO in rural or congested facilities situations.

With this brief exposition, the specific detail and structure of the present invention, as shown in the drawings, will be more easily understood following the specific funtional paths of the circuit. The circuit structure as well as function will be described simultaneously. The common nomenclature, part numbers and symbols, as used in telephone circuitry, are used throughout the drawing. The relays and other variable components are shown in their normal positions and conditions. Each of the relays K1 through K5 have a visual indicator such as LD1 through LD5, respectively, to indicate their activation.

II. Central Office Call Incoming and Outgoing Calls:

An incoming call over the CO line originates at the CO ring and tip terminals 18. The call is received at the telephone unit 16 T and R terminals (TEL T, TEL R), passing via the resistor R8, normally closed contacts A and B of relays K5, K1 and capacitor C1, finally exiting to the ring and tip terminals of the telephone unit 16. The telephone unit 16 is caused to ring in the normal manner, and when the user lifts the receiver, the circuit is automatically completed for full voice talk through the Central Office network.

When making an outgoing call, the subscriber uses telephone 16 in the normal and conventional manner and upon going off-hook is connected via CO terminals 18 through the reverse path noted above.

Note: During normal incoming and outgoing activity there is no interaction occurring between the other parts of the inventive circuit and the Central Office, and the rest of the circuit of the present invention is transparent to all CO functions.

III. Selection Circuits

The subscriber is capable of initiating one or more selective operational modes, either singly or in combination, using the single telephone unit 16. All selections pass through a tone processor circuit 32 comprising, for example, an MT8870B dual tone multifrequency receiver U2 employing a 3.58 MHz crystal oscillator X1, feeding via a 74HC138 a 3- to 8-line decoder U1. When the telephone set 16 is taken off-hook, the CO dial tone is heard.

Incidentally, the condition of the switch hook (on-hook/off-hook) is detected via a conventional optical switch device 34 comprising OP1A and its related field effect transistor VM1 and signal regulating circuits, which are connected across the terminals T and R of the telephone set 16.

The user may dial out to the CO line or, by dialing the appropriate pad keys (asterisk (*) or pound (#)), operates driver circuit 36 via the processor 32, by which the appropriate operation of one or more of the relays K1 through K5 is effected, thereby initiating selected alternative circuits and operating modes such as:

a) Placing the CO line on Hold

To place a CO line call on hold the pound (#) key is depressed. The resultant tone signal is passed to the tone processor 32 where the receiver (U2) and decoder (U1) operate to provide an output to the driver circuit 36. The pound (#) key tone exits from the decoder (U1) terminal 11 to a driver U6A. The hold circuit 24 is responsive to the activation of the relay, placing the R53 resistor across the Central Office COT and COR, with the consequent effect of placing the Central Office line on hold. The user may then select and dial out on the PBX/ICM or auxiliary circuit or merely hold the CO line call. If no other selection is made, the user dials the pound (#) key once more, toggling the K4 relay to remove the R53 holding resistor from the CO line. Similar restoration is effected by replacing the telephone receiver and going on-hook.

b) Incoming Call from PBX/ICM Circuit

If the telephone set 16 is on-hook and an incoming call is presented from the PBX/ICM T and R terminals 20, the signal is passed to ring detection circuit 38, where the Opto device OP1C fires Q9 transistor 40, which starts driver circuit 36 via driver UB4, resulting ultimately in the activation of relay K1. Upon activation, the A and B contacts of relay K1 reverse from their normal conditions, disconnecting the CO line 18 from the telephone set 16 and causing the PBX/ICM circuit to be connected to the telephone set 16 via the normally closed A and B contacts of the K2 relay and the and C1 capacitor. In response to the incoming call in the PBX/ICM line, telephone set 16 rings in the normal manner, alerting the user. When the telephone set 16 is answered, it is already connected to the PBX/ICM line, and two-way talk over the PBX/ICM line is immediately possible. Upon completing the call, the receiver of telephone set 16 is placed on-hook and all circuits are restored, reconnecting the telephone to the CO line. This circuitry allows the system to perform "automatic incoming line selection".

c) Call Waiting i) From the Central Office Line

Call waiting circuit 30 comprises an Opto device OP1B and associated circuits which are connected to the CO line circuit through the normally closed contacts of the K5 relay. When a ring signal is presented on the CO line by an incoming call, it is passed to the telephone set 16 as normal. If the receiver of the telephone set 16 is off-hook and the user is connected to any other circuit (detected by the hook switch detector 34), the ring signal activates the OP1B, firing the Q14 transistor 42 and the Hex Schmitt trigger device U5A 44, which in turn fires the Q13 transistor 46, causing T1 transformer 48 to produce a call waiting tone in telephone set 16 via tone generator circuit 26, signifying a second call. The call waiting tone is synchronized with the incoming ring frequency of the CO ring generator. At this point the user simply hangs up, and the CO line is connected to the telephone set 16, whereby the telephone set 16 will ring and may be answered in the usual manner.

ii) From the PBX/ICM Line

When ringing-in is presented on the PBX/ICM terminal 20, it is detected by the Opto device OP1C of the ring detection circuit 38, which fires the Q14 and Q13 transistors 42 and 46 and the predescribed associated circuits, causing transformer 48 to activate the tone circuit 26 to induce a call waiting tone on the CO line. The K1 relay does not operate as previously described in connection with a completed PBX/ICM call because the off-hook condition sensed by the hook detection circuit 34 causes VM3 field effect transistor 50 to ground, thereby preventing Q9 transistor 40 from operating.

At this point, the CO call can be placed on hold by depressing the pound (#) key and then depressing the asterisk (*) key to now operate the K1 relay. The K1 relay transfers the T and R terminals of the telephone set 16 to the incoming PBX/ICM. This connection trips the incoming ring, and a talkpath is established via contacts A and B of K2 relay. When the PBX/ICM call is completed, the CO call may be resumed by simply hanging up the telephone set receiver, restoring the K1 relay and retrieving the held CO call through the normally non-activated K1 and K2 relays. If at the end of an PBX/ICM call the user forgets that the CO line is on hold and he replaces the receiver on-hook, the telephone set 16 will begin to ring in an accelerated manner, thereby alerting the user to pick up the call. Such alert is accomplished through an alert circuit 52 by previous activation of the K4 relay (when CO call is originally connected) and associated circuits U6B, U5B, U5E, U5F and VM4 via the K5N, OHN and K4H connections. These circuits intermittently activate the K5 relay which causes local interrupted ringing to telephone set 16 from the ring generator connected to terminals 54. As noted earlier, an external ring generator (105V AC/20 cps) must be connected to the RA and RB J1 connector of the circuit board 10.

IV. Busy Intercom Call-Tone Signalling

If the single or common talkpath intercom ICM circuit is in use from any other subscriber in the system, then a busy condition is placed on the bus 12 connector J1 pin 2, inducing a signal voltage via busy-out 56, thereby preventing the K1 relay from operating via Q5, Q6 and VM2 transistor circuitry. This busy condition turns on transistors Q10, Q13 and Q14, which operate the K3 relay in the intrusion tone option device 26 via the B tone connections 58a and 58b. This induces operation of the transformer 48 and its associated circuit, causing a busy tone to be placed on intercom T and R circuits. This tells the user that the common intercom is in use and also alerts those who are using the intercom that someone else is attempting to call, thereby prompting early release of this circuit for other callers. When the PBX option is used, there is no need for this busy circuitry since each line is independently connected to a talkpath through the PBX.

V. Manual Ring of Telephone

If it is required to ring the telephone manually to alert the user to an incoming intercom call, then a connection is made to the buzz circuit 28 via a momentary normally external open button or switch placed on buzz bus J1 pin 3. Activation of this button or switch places a signal on buzz connection 60, which causes the transistor Q16 to turn on. Transistor Q16 in turn produces an output on connection OHN which is passed to VM5 FET 56 in the alert circuit 52. Consequently, the alert circuit 52 causes K5 to operate, connecting terminal 54 to the ring generator and producing a ring on the telephone T and R in cadence with the activation of the button or switch. If the user is off-hook on a CO call, a call waiting tone is placed on the line via the K2 relay in the same manner as described above for a call from the PBX/ICM.

VI. General Power Requirements and Connections

To ensure proper operating voltages an external power supply is placed across J1 pin 15 and 17. The power supply is preferably UL approved and supplies filtered 24 V DC through regulator 14. The positive (+) output is connected to J1 pin 15, and the negative (−) output is connected to J1 pin 17 as the common return. Multiple boards in a system are powered via a positive and negative power bus capable of distributing at least one-half ampere of current per circuit. When a single talkpath ICM circuit is used, only one-half ampere of current is adequate since only one circuit in the system would be operated at any given time.

The external telephone-type ring generator connected to terminals 54 via RA and RB bus terminal also must be UL approved. Talk battery is supplied by the CO, PBX/ICM, and auxiliary line circuits. The outgoing auxiliary circuit may be used as a switch or for communication purposes.

As has been seen, the present device may be used to add two-way, manual, or dial select intercoms; remote control operation; monitoring; and remote meter reading, simply by providing appropriate asterisk (*) or pound (#) codes, on the incoming call received by the telephone set 16, either by manual or automatic answering equipment. Data/fax equipment selection; remote alarm reporting; off-premise access; 3 to 1 line expansion; and two-zone paging to any existing telephone line can all be made in the same way.

Amongst the advantages and benefits of the foregoing, the circuit:

a) works over existing telephone lines and all touch tone extensions, providing up to three talkpaths on a single pair of wires;

b) requires no additional wiring to the individual apartments and incurs no telephone company toll call charges in its intercom or local building calls;

c) provides free call waiting or call holding, while maintaining true telephone quality voice communication;

d) provides distinctive ringing and alert tones;

e) avoids messy installation procedures and access to the subscriber's apartment for installation;

f) does not require Central Office control or servicing and does not interfere with or interrupt normal telephone service;

g) consumes low power, uses FCC approved parts throughout, and meets N.E.C. wiring codes;

h) is compatible with various types of lobby panels and may be retrofitted to existing building systems;

i) provides auxiliary lines which can be wired to emergency alert systems; and j) is highly reliable and cost-effective.

Various modifications, changes, and embodiments, including substitution of components, have been disclosed herein, and others will be obvious to those skilled in the art. Accordingly, it is intended that the present disclosure be taken as illustrative only and not limiting of the scope of the invention.

What is claimed is:

1. Add-on interface apparatus that converts a key pad operated telephone instrument into an intelligent call management device that is capable of operating on a telephone subscriber network having a central office line and a plurality of secondary lines so that a user may make outgoing calls and receiver incoming calls on the central office and secondary lines, the add-on interface apparatus comprising:

means lifts the receiver of the telephone instrument to complete a for completing a call path of said telephone instrument automatically with the central office line for full voice talk when the user lifts the receiver of the telephone instrument; tone processor means for initiating at least one operating mode that is selected by a user of the telephone instrument and implemented by pressing a predetermined key sequence on the key pad thereof; means to allow the telephone instrument to receive an incoming call on one of the plurality of secondary lines from at least one of an external PBX and intercom circuits, and including a ring detection circuit that, upon detection of a ring signal, causes the central office line which is connecting with the telephone instrument to be disconnected and causes the secondary line to be connected herewith whereupon the telephone instrument is operable for two-way talk over the secondary line; first means for implementing call waiting for an incoming call from the central office line, said first means including detection means sensing the use of said telephone instrument and producing a call waiting tone to signal the user that an incoming call from the central office line is waiting, and second means for implementing call waiting from the at least one of the plurality of secondary lines, said second means including means to detect ringing on at least one of the plurality of secondary lines and induce a call waiting tone on the central office line and, by user activation of a defined key pad sequence, allow the user receiving the incoming call from said secondary line and places the call in the central office line on hold.

2. The interface apparatus of claim 1, including another operating mode initiated by said tone processor and implemented by pressing a predetermined key sequence for switching between the central office line and any given one of such secondary lines.

3. The interface apparatus of claim 2, further including another operating mode initiated by said tone processor and implemented by pressing a predetermined key sequence for placing the call in the central office line on and off hold.

4. The interface apparatus of claim 1, further comprising means for implementing busy intercom call-tone signalling including means for causing a busy tone to be placed on an intercom call.

5. The interface apparatus of claim 1, said second means further including alert circuit means for ringing the telephone instrument with an accelerated signal if the call in the central office line is on hold and the receiver of the telephone instrument is placed on-hook.

* * * * *

UNITED STATES PATENT AND TRADEMARK OFFICE
CERTIFICATE OF CORRECTION

PATENT NO. : 5,537,465
DATED : July 16, 1996
INVENTOR(S) : Vincent M. Bellafiore It is certified that error appears in the above–identified patent and that said Letters Patent are hereby corrected as shown below:

Column 7, lines 1-2:   delete "lifts the receiver of the telephone instrument to complete"

Signed and Sealed this

Twenty-second Day of October, 1996

Attest:

BRUCE LEHMAN

Attesting Officer     Commissioner of Patents and Trademarks